M. J. BRODERICK.
TIRE ARMOR.
APPLICATION FILED JAN. 26, 1914.
1,100,950.
Patented June 23, 1914.
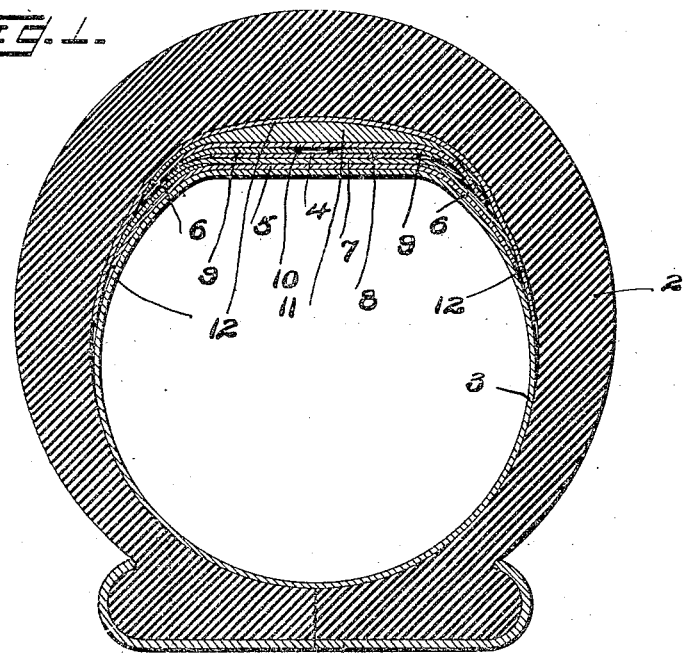
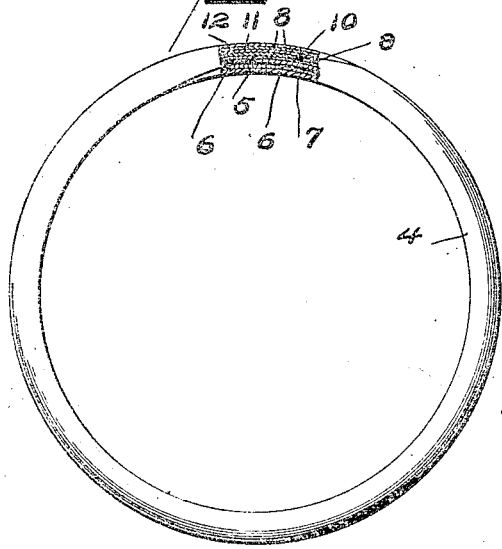
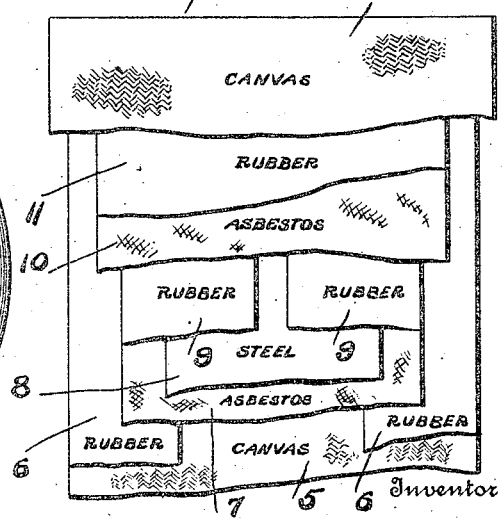
Witnesses
Harold Strauss
C. R. Ziegler
Inventor
Martin J. Broderick
By Joshua R. H. Potts
Attorney

UNITED STATES PATENT OFFICE.

MARTIN JOHN BRODERICK, OF PHILADELPHIA, PENNSYLVANIA.

TIRE-ARMOR.

1,100,950.　　　　Specification of Letters Patent.　　Patented June 23, 1914.

Application filed January 26, 1914. Serial No. 814,265.

*To all whom it may concern:*

Be it known that I, MARTIN J. BRODERICK, a citizen of the United States, residing at Philadelphia, in the county of Philadelphia and State of Pennsylvania, have invented certain new and useful Improvements in Tire-Armors, of which the following is a specification.

My invention relates to improvements in tire armors, the object of the invention being to provide an armor which is adapted to be positioned between the inner tube and the outer shoe of an ordinary pneumatic tire, and protect the inner tube from puncture without interfering with the flexibility and cushioning qualities of the tire.

A further object is to provide in an armor of this character, a steel ribbon which is so incased between longitudinal strips of rubber, asbestos, and canvas as to prevent the transmission of heat to the ribbon or from the ribbon, and which strips so protect the edges of the ribbon as to prevent the latter from injuring the tire.

A further object is to provide an armor of this character which may be manufactured and sold to the trade and installed in the tire by any one of average intelligence, not requiring skilled labor.

With these and other objects in view, the invention consists in certain novel features of construction and combinations and arrangements of parts as will be more fully hereinafter described and pointed out in the claims.

In the accompanying drawings: Figure 1 is a view in transverse section through a tire illustrating my improvements in position between the inner tube and the shoe. Fig. 2 is a view in side elevation partly in longitudinal section of my improved armor removed, and Fig. 3 is a fragmentary plan view illustrating the different thicknesses of material of the armor broken away at different lengths to indicate parts beneath.

1 represents a rim, 2 a shoe, and 3 an inner inflated tube all of ordinary character such as in general use. Between the inner tube 3 and the shoe 2, at the outer tread portion of the latter, I locate my improved armor 4 which is constructed of canvas, rubber, asbestos, and steel with the several parts arranged in an improved manner as will now be pointed out, reference being made particularly to Fig. 3.

The inner face of the armor comprises a strip of canvas 5 upon which at its edges I locate strips of rubber 6 spaced apart. On the rubber strips 6, a strip 7 of woven asbestos is located, and on the asbestos strip 7, a steel ribbon 8 is provided. This steel ribbon is extremely thin and embodies great elastic properties, so that while it is strong enough to turn any sharp instrument that would puncture the tire, it is sufficiently elastic to prevent any reduction in the cushioning qualities of the tire. As this strip is thin, its edges are correspondingly sharp and the asbestos sheet 7 as well as the rubber strips 6, serve to protect the sharp edges and keep them from cutting through the armor.

The outer surface of the ribbon 8, at its edges, is covered by parallel rubber strips 9, the latter in turn covered by a strip 10 of asbestos. Over the asbestos strip 10, a rubber strip 11 is located, and it will be observed particularly by reference to Fig. 1, that this rubber strip 11 is thickest at its center and tapers to its edges which allows the shoe to assume its normal curved shape, and yet maintain the steel ribbon 8 in its flat shape. The reason I particularly provide a strip of this character to maintain the ribbon in a flat condition is that any transverse bending of the ribbon when pressure or weight is applied on the tire would break the ribbon, hence it is necessary to keep the ribbon flat in order that it properly perform its functions, but it is also desirable that the outer surface of the armor be rounded transversely to fit within the shoe, hence the rubber strip 11 is given the shape set forth. Over the rubber 11, I locate an outer strip 12 of canvas, and this strip 12 is wider than the inner strip 5, so that its edges overlap the strip 5. All of the parts forming the armor are cemented or vulcanized together, so that they form a single strip. At the ends of the strip the armor overlaps and to prevent bulging at the overlapping portions, the various strips of the armor are regularly and progressively off-set to make oppositely facing bevels at either end.

The relatively narrow rubber strips 6 and 9 not only protect the sharp edges of the steel ribbon 8, but they provide a strengthening reinforce at such edges where by reference to Fig. 1, it will be noted the armor bends to accommodate itself between the inner tube and the shoe. It is here that the greatest wear will come, and the flexibility of the rubber will allow the parts to move and prevent to a great extent any injury of the armor by reason of the ribbon.

In tires, and particularly armors for tires, one source of trouble is the generation of heat by the contact of the tire with the ground. By my particular arrangement of parts, I thoroughly protect the inner tube from this heat. By reference to Fig. 3, particularly, it will be observed that the asbestos sheet 10 is interposed between the outer rubber strips 11 and 9, the latter in direct contact with the steel ribbon so as to prevent as far as possible the transmission of any heat to the steel ribbon. It is, of course, probable that some heat will reach the ribbon and to prevent any possibility of this heat passing to the inner tube, the inner asbestos strip 7 is provided. By the location of the asbestos sheets as above described, the rubber strips 9 and 6 are protected as far as possible, and it is necessary that these rubber sheets shall be protected, because they extend over the sharp edges of the ribbon and protect all parts of the tire, hence the particular arrangement of parts is not merely an arbitrary one, but is the result of careful study and experiment.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A tire armor comprising a flat steel ribbon appreciably narrower than the armor, inclosed between strips of flexible material and having relatively narrow strips at opposite sides of the ribbon and over the edges thereof, the outer edges of the strips projecting an appreciable distance beyond the edges of the ribbon, substantially as described.

2. A tire armor comprising inner and outer strips of canvas, a steel ribbon appreciably narrower than the armor and interposed between the canvas strips and having asbestos strips at opposite sides thereof with rubber strips over the edges of the ribbon, the outer edges of the strips projecting an appreciable distance beyond the edges of the ribbon, substantially as described.

3. A tire armor comprising an inner sheet of canvas, narrow rubber strips on the same at the edges thereof, an asbestos strip on the rubber strips, a steel ribbon on the asbestos strip, other rubber strips over the edges of the ribbon, an asbestos strip over the last-mentioned rubber strips, a relatively wide rubber strip over the last-mentioned asbestos strip, said last-mentioned rubber strip thickest at its center and tapering to its edges, and a canvas strip over the last-mentioned rubber strip and all of said strips secured together, substantially as described.

In testimony whereof I have signed my name to this specification in the presence of two subscribing witnesses.

MARTIN JOHN BRODERICK.

Witnesses:
C. R. ZIEGLER,
S. W. FOSTER.